Patented July 5, 1927.

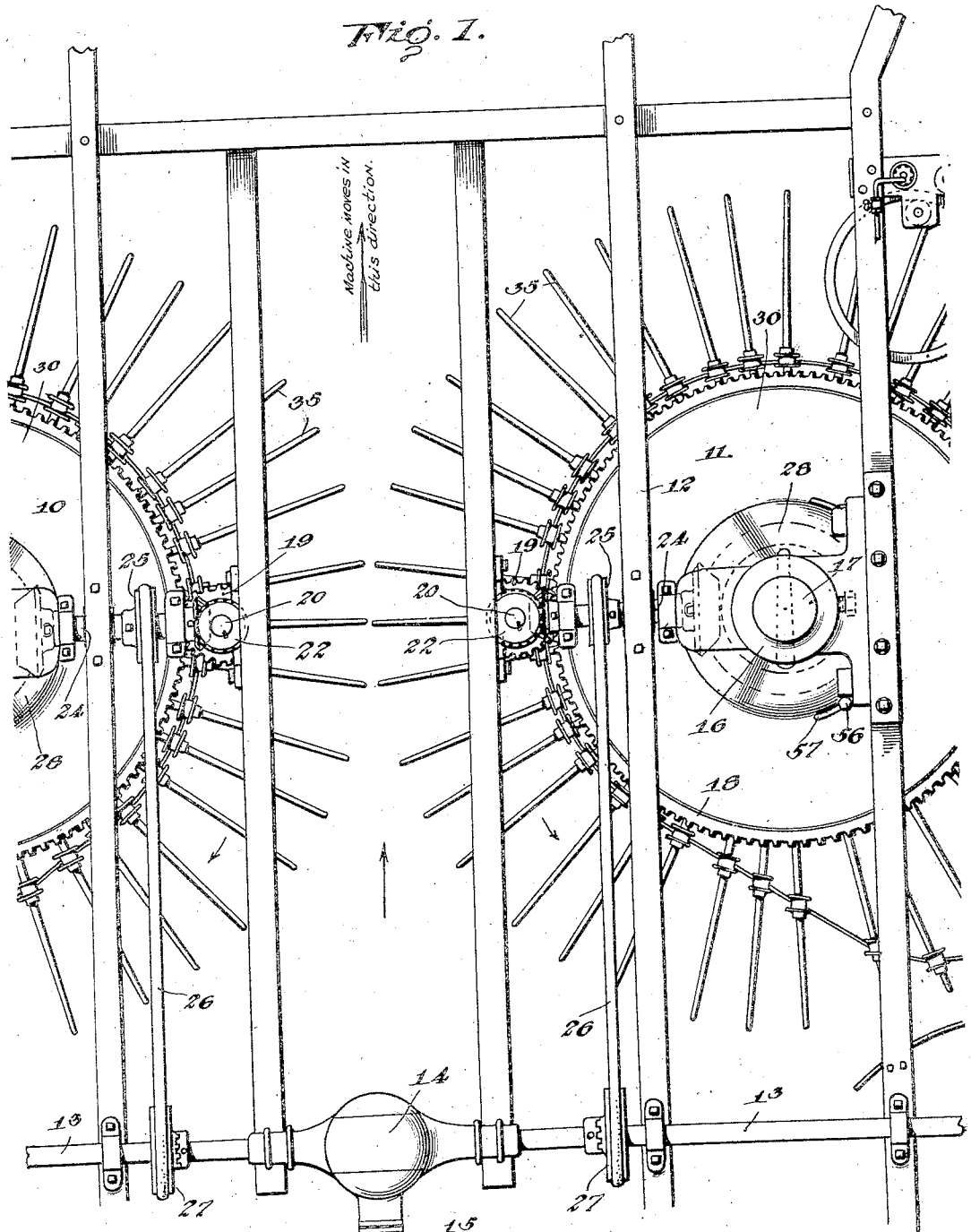

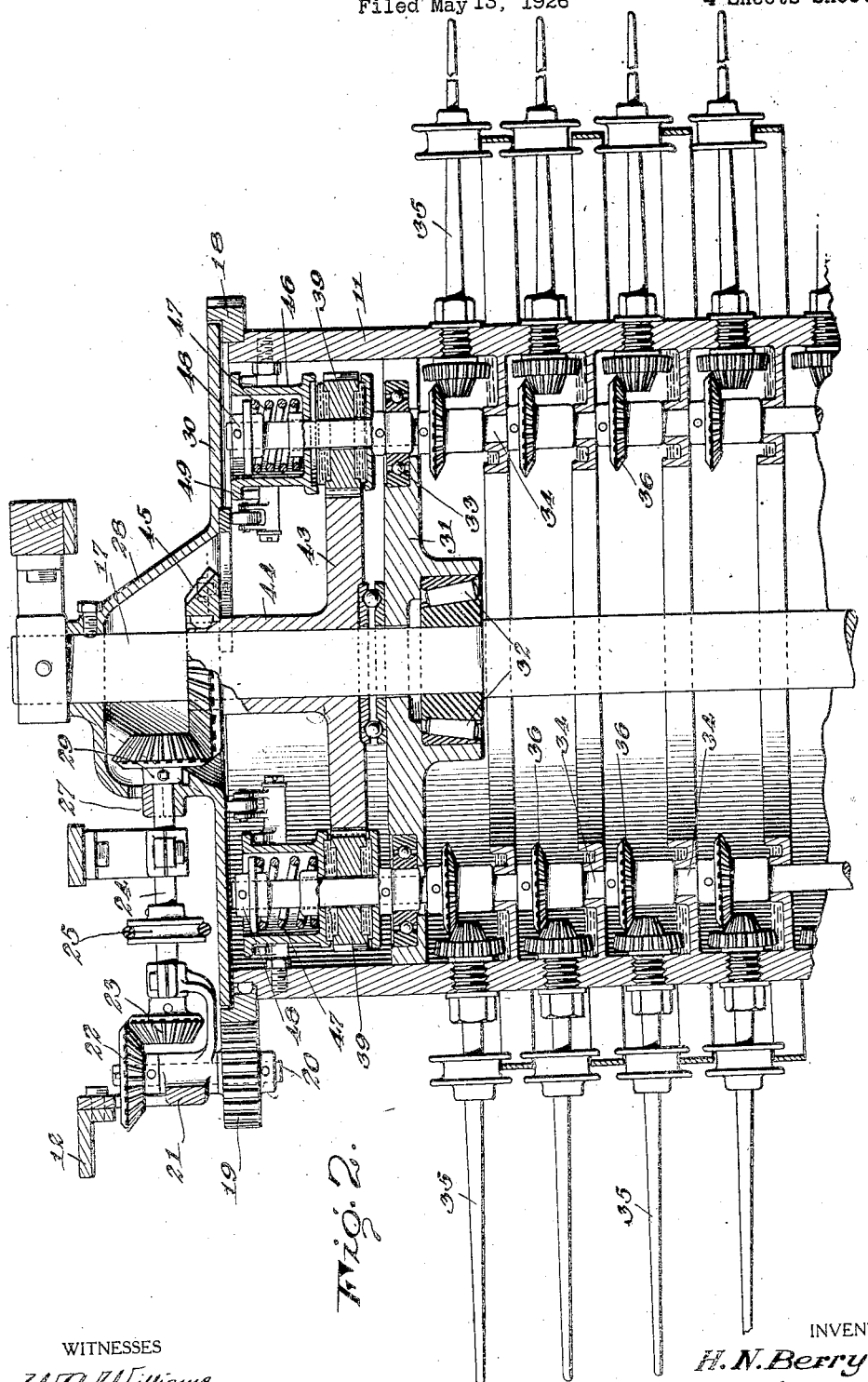

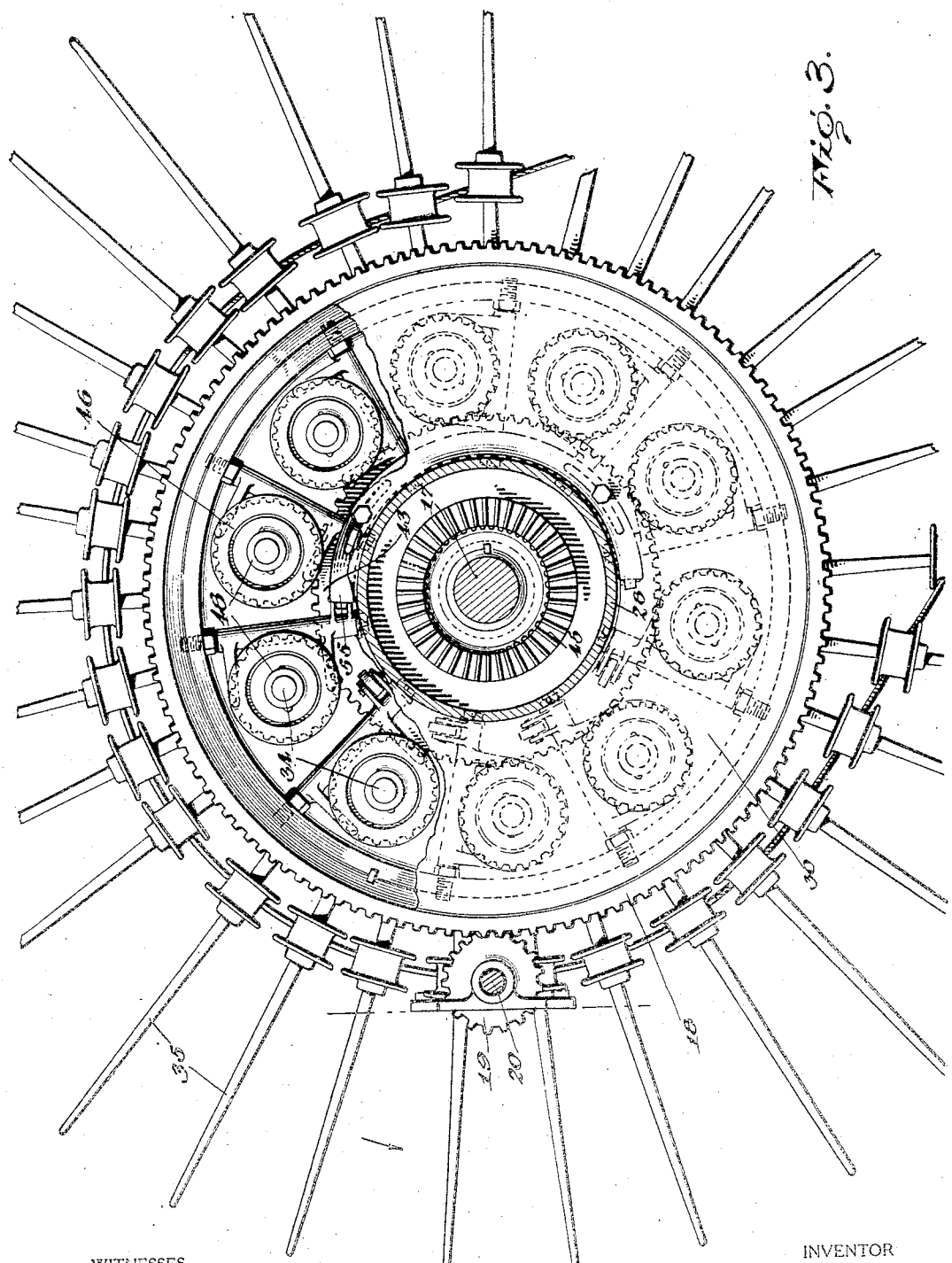

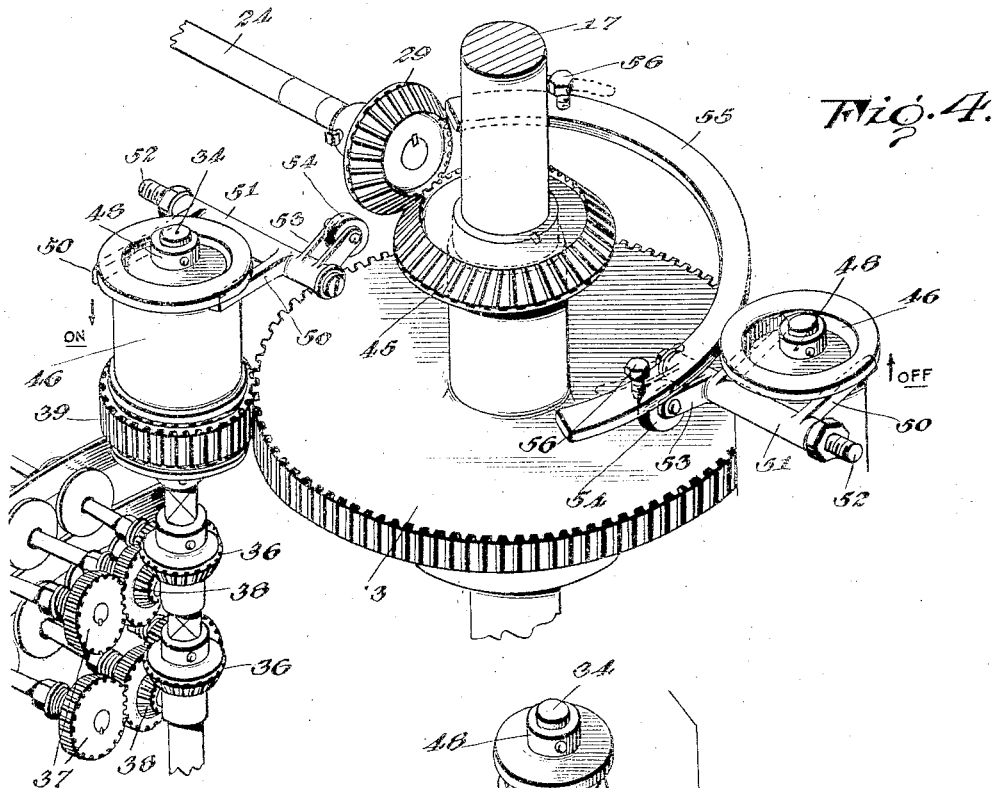

1,635,161

UNITED STATES PATENT OFFICE.

HIRAM N. BERRY, OF GREENVILLE, MISSISSIPPI.

COTTON PICKER.

Application filed May 13, 1926. Serial No. 108,927.

My present invention relates generally to cotton pickers, and more particularly to cotton pickers of that type described and claimed in my Patent #1,530,151 granted March 17, 1925, wherein the picking apparatus includes a pair of laterally spaced picking cylinders, each provided with radially outstanding picking fingers. Since the efficiency of such an apparatus depends to some extent upon there being a great number of such picking fingers or needles radiating from each cylinder, and since the efficiency further depends to some extent upon the rotation of all of these picking fingers or needles at considerable speed, the manner of driving the parts becomes of paramount importance, and it is with this portion of the apparatus that my invention has more especially to do.

In my patent above referred to I proposed the use of a series of needle driving shafts within and around each cylinder, each shaft being geared within the cylinder to a series of picking fingers both vertically and horizontally, since it would not be possible to provide within the cylinder a number of vertical shafts equal to the desired number of vertical rows of picking fingers.

Furthermore in my patent above referred to the upper ends of the needle driving shafts above the cylinders were provided with pulleys, and these pulleys were engaged by certain portions of driving belts so arranged as to permit of engagement and disengagement of the pulleys with the belts during the rotation of the cylinder, since it is only desired to rotate or drive the needles during their passage along the inner or adjacent portions or sides of the cylinders.

According to my present improvements, I provide for the driving or rotation of the needles through connections including gears always in mesh, and I do away with the belts and pulleys, each of the vertical shafts of the cylinders being provided with automatically engageable and disengageable clutch elements whereby the driving of the needles or fingers through constantly engaging gears may be easily and efficiently controlled, so that the fingers or needles will be driven or rotated during only the desired portion of their revolution with the cylinders.

In the accompanying drawing which illustrates my present invention and forms a part of this specification:

Figure 1 is a top plan view illustrating certain portions of two cylinders, and a portion of the frame of the cotton picking apparatus, embodying my present improvements;

Figure 2 is a detail vertical sectional view through the upper portion of one of the cylinders illustrating the connections proposed by my invention;

Figure 3 is an enlarged detail top view of one of the cylinders, partly broken away to expose the connections proposed by my invention, Figure 4 is a detail perspective view illustrating certain of the connections proposed by my invention, and, Figure 5 is a similar view of one of the vertical shafts with its parts in detached relation.

Referring now to these figures, and particularly to Fig. 1, I have generally indicated a pair of cylinders 10 and 11, mounted in the vertical laterally spaced relation shown within a frame, including longitudinal supports 12, and rear axles 13 connected through a differential 14 to a driven shaft 15. This driven shaft may be actuated in any suitable manner and in practice is usually driven by an internal combustion engine mounted upon the frame of the apparatus as in my patent above referred to.

Certain of the longitudinal supports 12 of the frame have bearings 16, in which the upper ends of uprights 17 are securely fastened. These uprights are disposed axially of the cylinders 10 and 11, the latter of which revolve in practice around the uprights and are provided for this purpose with ring gears 18 around their upper ends engaged by spur gears 19. Each of the gears 19 is secured upon the lower end of a shaft 20, rotatable in the bearing bracket 21 and provided at its upper end with a bevel gear 22 engaging bevel gear 23 upon one end of a shaft 24, all as plainly seen by a comparison of Figs. 1 and 2. Each shaft 24 has thereon pulley 25 connected by a belt 26 to a pulley 27 disposed upon and in clutched engagement with one of the axles 13 before mentioned. Each shaft 24 is furthermore extended at its opposite end through a bearing 27 in a portion of the hood 28 above its respective cylinder and is provided within said hood with a bevel gear 29.

Each hood 28, as best seen in Fig. 2, has a lower plate 30 which is disposed to form a cover for its respective cylinder and it will be noted from Fig. 2 that each hood 28 is securely fastened to the upper end of the respective upright 17, so that it is thus held against rotation.

Within each cylinder is fixed a head block 31 which is revolubly mounted upon the upright 17, preferably by means of anti-friction bearings 32, this head block having at spaced points therearound bearings 33 for the several vertical shafts 34, the latter of which drive the picking fingers or needles 35 through gearing including bevel gears 36.

By reference to Figs. 4 and 5, it will be noted that each vertical shaft 34 not only drives the vertical series of fingers 35 in line therewith, but also the two vertical lines of fingers or needles upon opposite sides thereof, the needles being connected together in series of three by virtue of spur gears 37, of which the central spur gear has a bevel gear 38 engaging one of the bevel gears 36 of the corresponding vertical shaft 34.

The vertical shafts 34 project above the head block 31 and are there provided with spur gears 39 loose thereon between upper and lower clutch disks 40 and 41, the latter disposed between the lower surface of gear 39 and a plate 42 rigidly connected to the shaft.

The gears 39 of the several shafts 34 are in constant mesh with a large spur gear 43 revolubly mounted on the upper portion of the axial upright 17, and having at its central portion an upstanding hub 44 to the upper end of which a bevel gear 45 is securely fastened. This gear 45 meshes with the gear 29 of shaft 24 before mentioned, so that power is in this way transferred from the shaft 24 through the gears 29 and 45 to the spur gear 43, and from the latter to the gears 39 of the several upright shafts 34 within each cylinder.

Above the upper clutch disk 40 of each shaft 34 there is loosely disposed upon the shaft a spring cage 46, the lower surface of which is adapted for engagement with the upper clutch disk 40 and thus forms one clutch member of which the stationary plate 42 constitutes the other clutch member. Within the cage 46 a spring 47 engages the base of the cage at its lower end and has its upper end in engagement with a collar 48 securely fastened to the upper end of the shaft 34 within the cage, and in the normal position of the parts therefore the cage 46 is pressed downwardly by the tension of spring 47 so that the parts are held in the clutched position with the gear 39 securely gripped between the base of the cage 46 and the stationary plate 42, so as to effectively clutch the gear with the shaft, especially in view of the presence of the clutch disks 40 and 41.

Around the upper end of each of the spring cages 46 is an outstanding flange 49 and below this flange are extended the laterally projecting fingers 50 of a yoke 51 journalled upon a shaft 52, whose outer threaded end is securely locked in the wall of the cylinder. At its inner portion each yoke 51 has an angularly projecting arm 53 provided at its extremity with a roller 54, the latter adapted for engagement with an arcuate cam strip 55, which is securely fastened against the under surface of the lower plate 30 of the hood 28, by means of upstanding bolts 56. It will be noted from Figs. 1 and 3 that these bolts 56 upstand through slots 57 of the top plate 30, and it thus becomes obvious that the cam strip 55 may be shifted to control the clutching and unclutching of the several shafts 34 during revolution of the cylinder.

As the cam strip is shown positioned in Figures 1 and 3, it is obvious that the several shafts 34 will be clutched as they approach the inner portion of the cylinder during revolution of the latter, and will be unclutched as they pass along the outer portion of the cylinder where the cotton is taken off of the needles or fingers.

Thus from the foregoing and while the details of the connections and parts as above outlined may be varied to some extent, it is obvious my invention presents an effective and efficient means for actuating the picking fingers or needles in the desired manner through the use of connections including constantly meshing gears, so that there is no necessity for rapidly rotating parts to be moved in the operation of the apparatus into and out of engagement with one another.

In operation, as the rollers 54 ride upon one end of the cam strip 55 the respective yokes 51 will be rocked during the downward shifting of the angular arms 53 and this operation raises the fingers 50, engaging the upper flanges 49 of the spring cages 46 so that these spring cages will be shifted upwardly against the tension of the spring 47 to the released or unclutched position shown at the right in Fig. 2. According to my present construction the parts are readily accessible, can be easily reached, and will be strong, durable and effective in use.

I claim:

1. In a cotton picker, a picking cylinder, means for revolving the cylinder, a stationary axial post on which the cylinder is journalled, a series of shafts journalled vertically in the cylinder and around the said post, picking fingers radiating from the cylinder, and geared in groups to said vertical shafts, each of said shafts having upon its upper end portion a loosely mounted gear, a rotating gear sleeved on said post in the upper portion of the cylinder and in constant mesh with the said upper gears of the several shafts, means upon the upper portion of each of the shafts for clutching its said gear in connection with the shaft and including a controlling spring, gearing for rotating said upper gear of the cylinder, a stationary top plate closing the top of the cylinder and secured to said post, and means controlled by the top plate for shifting the gear clutching means of the several shafts into and out of active position.

2. In a cotton picker, a picking cylinder, means for revolving the cylinder on a vertical axis, a plurality of picking fingers radiating from the cylinder therearound, a series of vertical shafts journalled within and around the cylinder and having geared connections with said picking fingers, gears loosely mounted upon the upper portions of the several shafts in the same horizontal plane, clutch means for securing said gears in connection with the shafts, including a clutch member movable on each of the shafts, and a spring normally holding said clutch member in active position, a clutch throw-out member for each of said shafts, a stationary post axially of the cylinder, means for rotating the said shaft gears including a rotating gear member journalled on said post in the upper portion of the cylinder and in constant mesh with the several shaft gears, and a stationary top member for the cylinder forming a cover therefor, to house and protect the rotating gear and the several clutches and clutch gears, said top member having means for automatically shifting the said clutch throw-out members into and out of active position during revolution of the cylinder.

3. In a cotton picker, a picking cylinder having an upper ring gear, a stationary axial post on which said cylinder revolves, a plurality of picking fingers radiating from the cylinder therearound, a series of vertical shafts journalled within and around the cylinder and having geared connections with said picking fingers, gears loosely mounted upon the upper portions of the several shafts in the same horizontal plane within the cylinder, clutch means for securing said gears in connection with the shafts, including a clutch member movable on each of the shafts, and a spring normally holding said clutch member in active position, a clutch throw-out member for each of said shafts, a rotating master gear member journalled in the upper portion of the cylinder on said post and in constant mesh with the several shaft gears, a vertical shaft at one side of the cylinder having a lower gear engaging the ring gear of the cylinder, a horizontal driven shaft above the cylinder geared at one end to the upper end of the vertical shaft and in geared connection at its other end with the said master gear, a stationary top plate forming a cover for the cylinder to house and protect the clutch, and an arcuate controlling element stationarily arranged on said top plate and in the path of movement of the said clutch throw-out members whereby the latter will be shifted into and out of active movement during rotation of the cylinder.

HIRAM N. BERRY.